June 2, 1936.    H. REFFELT ET AL    2,042,631
REENFORCED PHONOGRAPH RECORD
Filed May 16, 1935
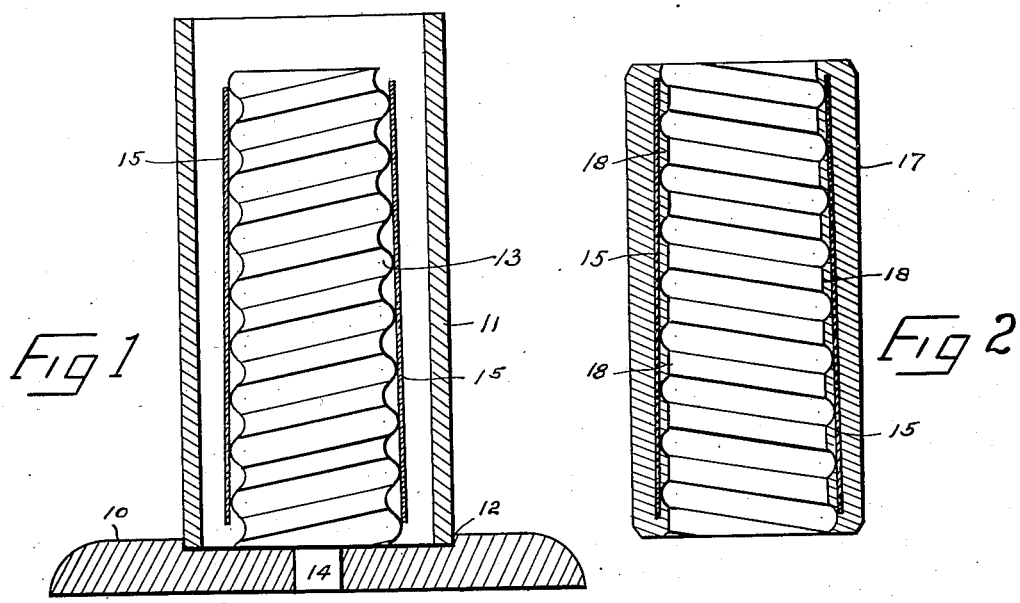
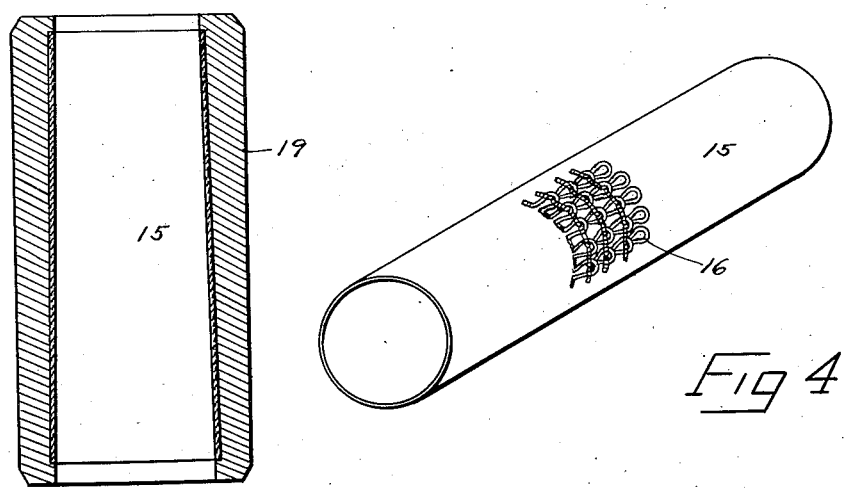
Inventors,
Herman Reffelt,
Charles Cagnon,
BY
ATTORNEYS.

Patented June 2, 1936

2,042,631

UNITED STATES PATENT OFFICE 2,042,631

REENFORCED PHONOGRAPH RECORD

Herman Reffelt, Brooklyn, and Charles Cagnon, New York, N. Y.

Application May 16, 1935, Serial No. 21,736

3 Claims. (Cl. 274—44)

The invention relates to reenforced sound records of the cylindrical type such as are used on phonographs, dictating and similar machines. It has for its main object to provide a superior way of reenforcing such records so as to minimize breakage and to prevent the complete shattering or separation of the parts should such records be broken. Another object is to employ a reenforcing medium which will not interfere with the normal expansion and contraction of the record such as takes place by changing temperatures.

A further object is to employ a reenforcing medium which will not only adhere to the material of which the records are made, but which will absorb some of this material so as to form an integral part therewith. Additional objects are to provide a method of reenforcing records which will not necessitate any change in the equipment ordinarily used for moulding such records, which will not alter their appearance nor materially increase their cost.

These and various other objects and advantages will be readily understood from the following description and from the accompanying drawing of preferred embodiments of the invention, in which, however, certain modifications might be made without departing from the scope of the appended claims. In the drawing Fig. 1 is a sectional elevation of a mould such as commonly used for moulding records, Fig. 2 is a sectional elevation of a record made in this mould, Fig. 3 is a sectional elevation of a modified record; and Fig. 4 is a perspective view of the reenforcement used.

We are aware that the prior art shows records in which various kind of materials have been used for reenforcement, and that some of these materials have been used more or less in the same manner that it is proposed to use the reenforcing material in the present invention. However, all of the materials previously used have certain disadvantages which the present invention proposes to overcome.

Loose fibrous material has been used as a filler and while this is ideal in the way in which the wax-like material of the record mixes with and is absorbed by the fibres, it has a serious defect in that the fibres are likely to work to the surface of the record, while it is being moulded, and thus ruin the surface.

Sized, woven fabric, as well as perforated sheet rubber, has been used. These materials have the disadvantage that they cannot absorb the wax-like material of the record. While the wax-like material may flow through the openings in these materials, it does not form the complete bond with the reenforcing material which is obtained where fibres are used. In other words, if a record made with rubber or sized fabric is broken, the reenforcing material will be found to just lay in pockets formed in the wax.

It is the object of the present invention to make use of the advantages offered by fibrous material, but to use such material in a way in which its exact location in the mass of wax will be assured.

Referring now to the drawing. Records of this type are generally made in a mould of the type shown. It consists of a base 10 and a cylinder 11 set in recess 12 in the base. A core 13 is held concentrically in the base by means of a stud 14 inserted in a hole in the base. The core may be a plain tapered core, it may be fluted as shown, or made in the various other ways now in use.

The reenforcing material 15 used in the present invention consists preferably of a knitted fabric tube, such as shown in Fig. 4 where the mesh of the knitting has been shown greatly enlarged at 16. This tube, being knitted, has no seam and it need not be tapered as it is a well-known fact that knitted material will readily stretch in any direction, whereas woven material has but very little stretch, except on the bias.

The tube is made slightly smaller than the diameter of the core so that it can be stretched over the core. After the tube has been placed in the position on the core, plainly shown in Fig. 1, the mould is filled with the wax-like material from which a record is made. Not only will this hot wax flow between the meshes of the knitted material but the thread of the material itself, being preferably made of highly absorbent material, will absorb a quantity of the wax.

After the record is sufficiently solidified to be removed, it is taken from the mould and the core is withdrawn in the usual manner. The record 17 may now be finished in the regular way and the bore may be reamed so as to leave a plurality of flat lands, as shown at 18.

In Fig. 3 a record 19 is shown which has been moulded with a plain tapered core. In this case the reenforcing material is directly on the surface of the bore. It is perfectly feasible to make records in this manner as the wax is so perfectly absorbed by and mixed with the reenforcing material that the bore can be finished without any danger of destroying or dislodging it.

As previously said, the invention resides primarily in employing an absorbent, fibrous material made up in such a manner that it can be supported on the core of the mould in which the records are made while the record is being moulded.

Having described our invention and its objects, what we claim as new and wish to protect by Letters Patent is:

1. A cylindrical record having a tapered bore and a reenforcing member imbedded in the material of which the record is molded; said reenforcing member comprising a relatively open-meshed knitted sleeve made of absorbing material.

2. A cylindrical record having a fluted bore and a reenforcing member imbedded in the material of which the record is molded; said reenforcing member comprising a relatively open-meshed knitted sleeve made of absorbing material and located adjacent to the bottoms of the flutes.

3. A cylindrical record having a bore formed with helical grooves and a reenforcing member imbedded in the material of which the record is molded; said reenforcing member comprising a relatively open-meshed knitted sleeve made of absorbing material and located adjacent to the root diameter of said grooves.

HERMAN REFFELT.
CHARLES CAGNON.